March 10, 1964

H. B. CHATFIELD 3,124,019

COLD FORMING MACHINE

Filed Feb. 2, 1962

INVENTOR
Henry B. Chatfield
BY McCoy, Greene & de Grotenhuis
ATTORNEYS

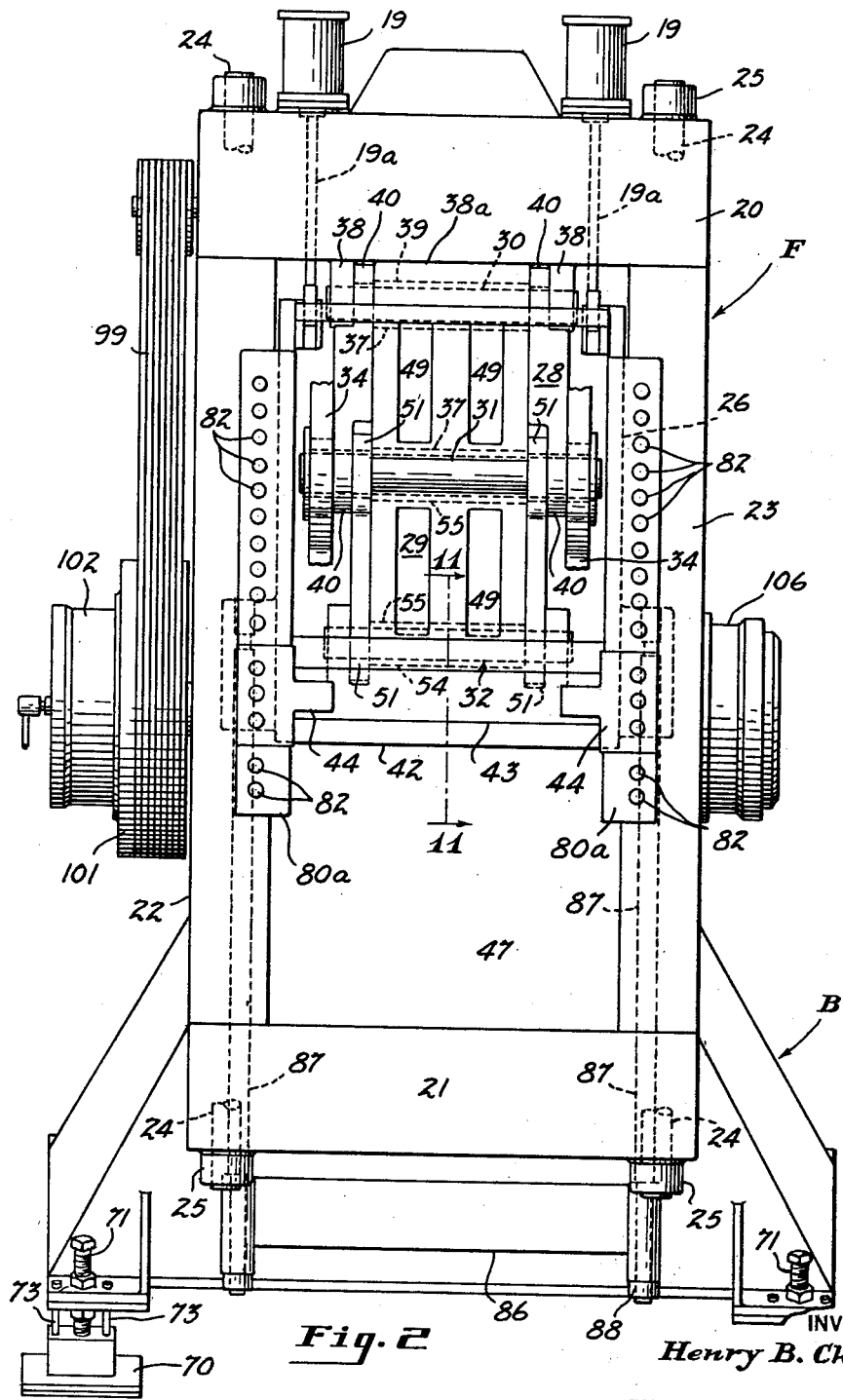

March 10, 1964     H. B. CHATFIELD     3,124,019
COLD FORMING MACHINE
Filed Feb. 2, 1962     6 Sheets-Sheet 3
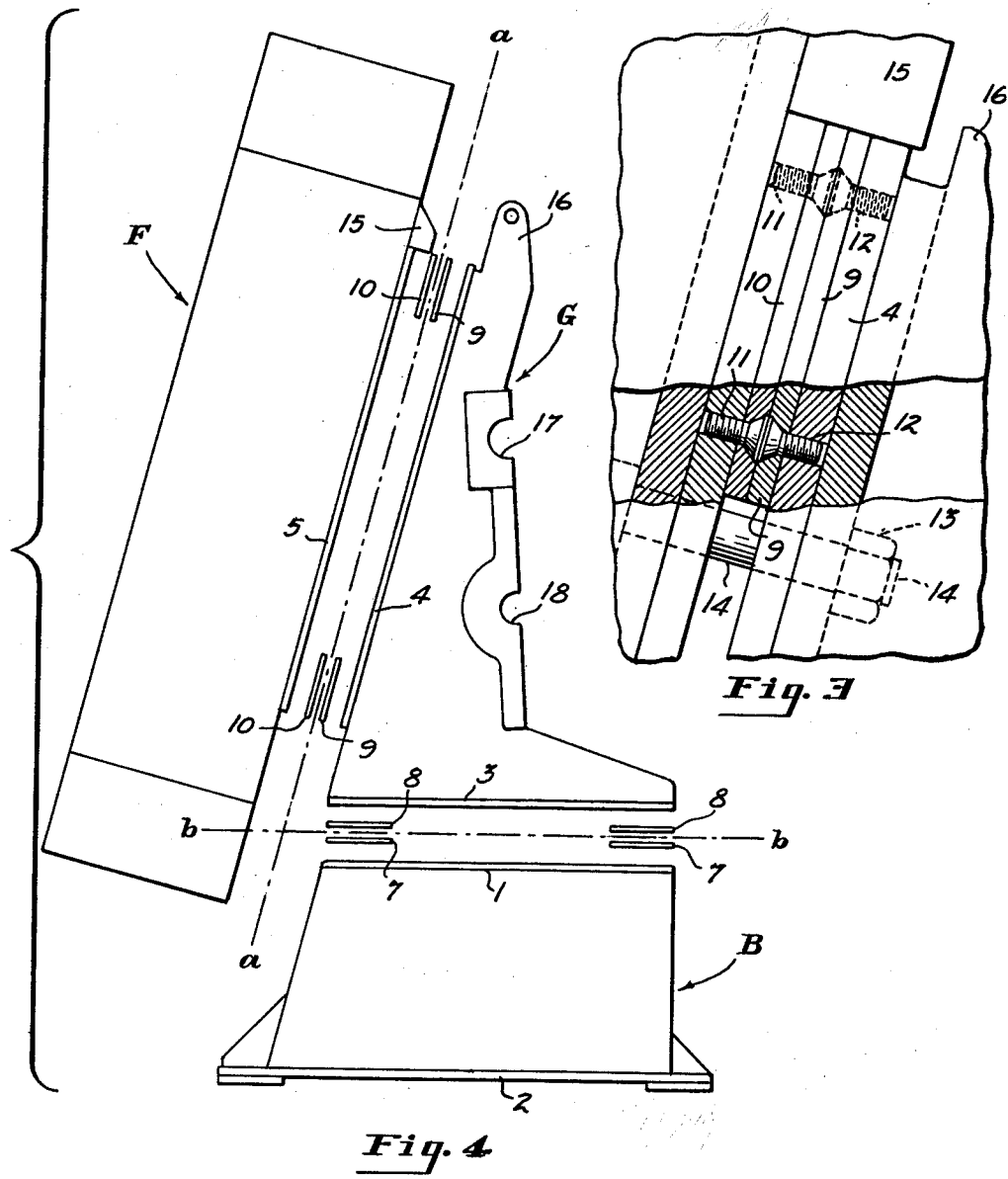
INVENTOR
*Henry B. Chatfield*
BY
ATTORNEYS

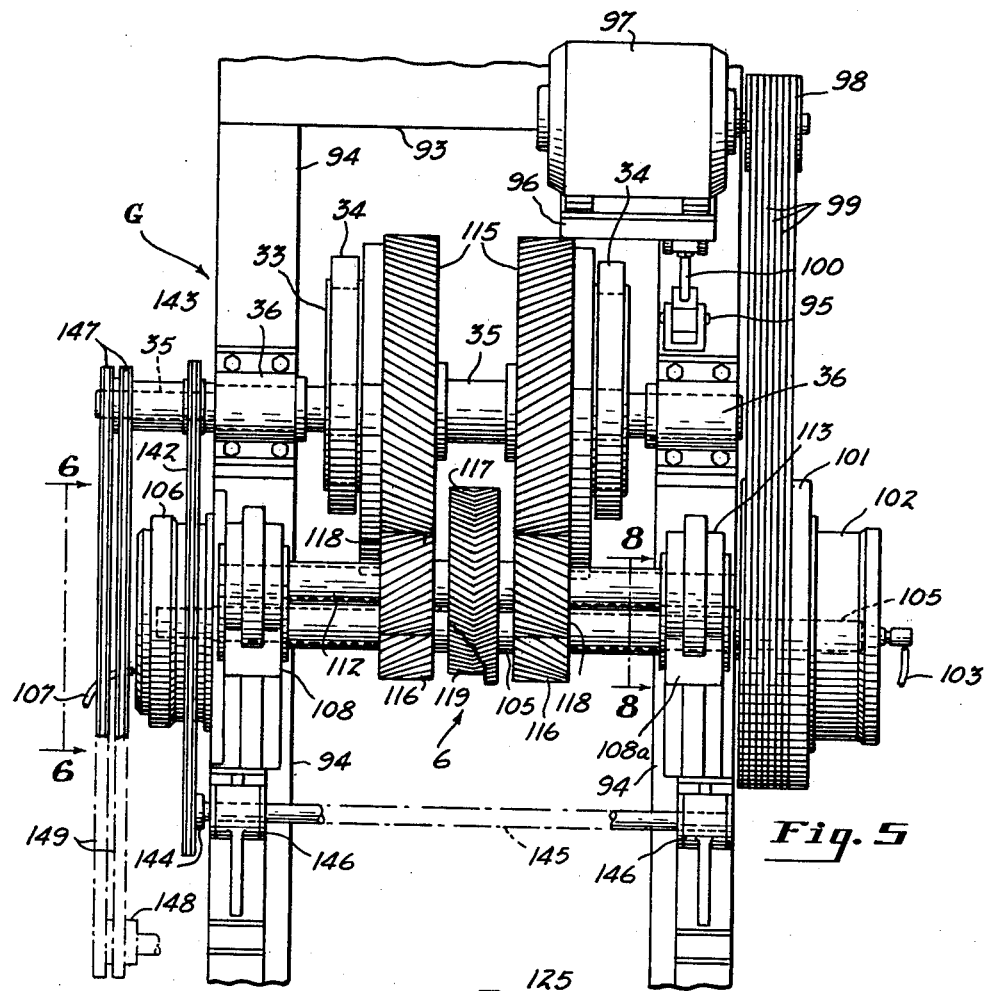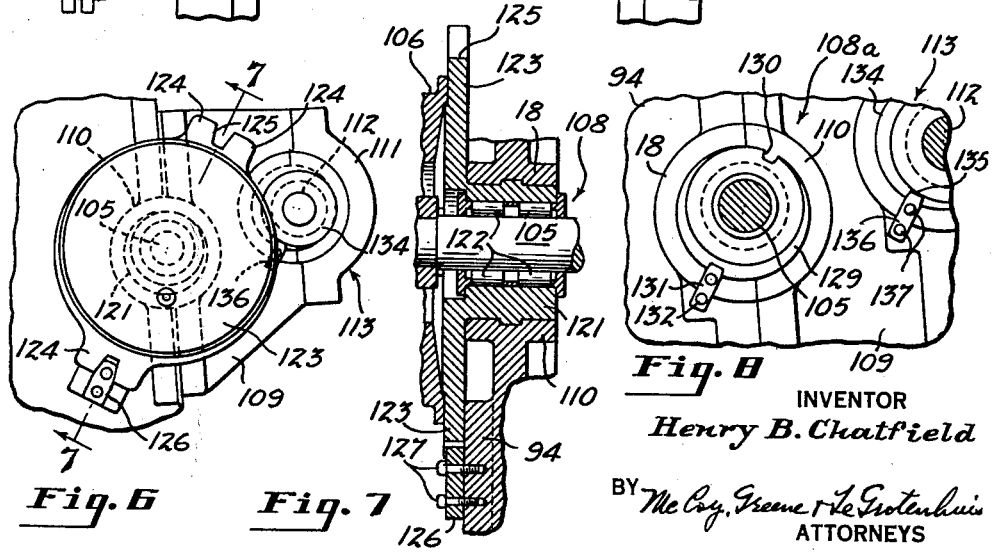

INVENTOR
Henry B. Chatfield
ATTORNEYS

March 10, 1964     H. B. CHATFIELD     3,124,019
COLD FORMING MACHINE
Filed Feb. 2, 1962     6 Sheets-Sheet 6
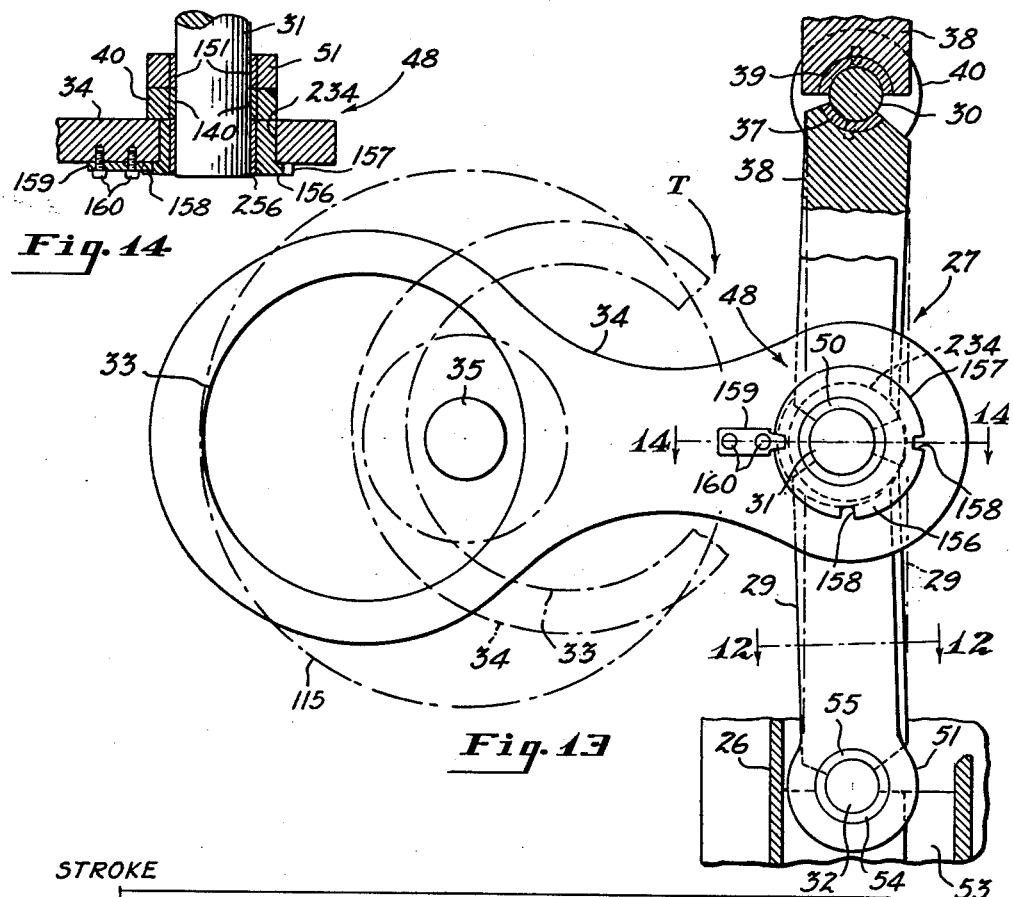
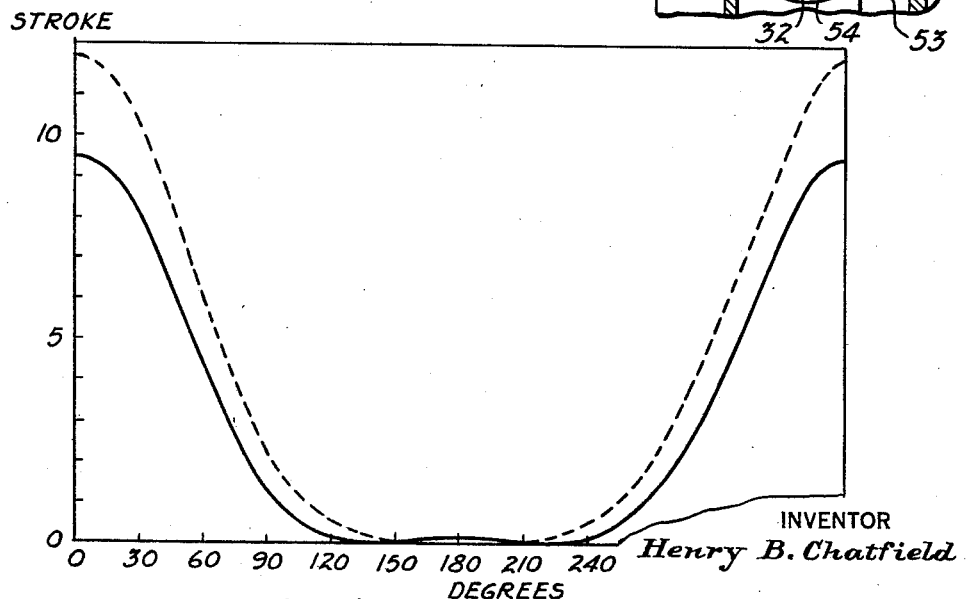
INVENTOR
Henry B. Chatfield
BY McCoy, Greene & LeGrotenhuis
ATTORNEYS

United States Patent Office 3,124,019
Patented Mar. 10, 1964

3,124,019
COLD FORMING MACHINE
Henry B. Chatfield, Santa Ana, Calif., assignor to Textron Inc., Providence, R.I., a corporation of Rhode Island
Filed Feb. 2, 1962, Ser. No. 170,841
16 Claims. (Cl. 78—13)

The present invention relates to a versatile, heavy duty, cold forming machine and more particularly to a high speed, double-stroke, knuckle press of simple and unusual construction having a capacity of several hundred tons.

Heretofore cold forming machines with a capacity of 100 tons or more have been large, expensive, cumbersome machines built to perform one particular type of operation. Such machines were permanent fixtures in the factory due to their size and the special foundations required to receive and support them. As a result they had a rapid rate of obsolescence and were unsuitable for small manufacturers.

In the past attempts have been made to reduce the cost and increase the versatility of the heavy duty machines needed for cold forming of steel and other metals, but the industry concluded that large machinery was essential to form the parts with the required accuracy and that, for the fastest and most efficient operation, each machine should be designed for the particular job.

Generally, a cold forming machine should have a ram stroke of at least 10 inches and be able to apply extreme pressure to the work during more than one inch of its stroke. Because of these requirements and other factors, knuckle presses have heretofore been considered impractical for ordinary cold forming operations. The reduced weight and other advantages of previously known toggle-type presses were more than offset by excessive height (or inadequate working stroke), rapid wear, lack of accuracy, excessive deformation under load, excessive bearing loads, and other disadvantages when attempts were made to use such presses for cold forming operations.

The machine of the present invention represents a revolutionary departure from the established practices in the cold forming art in that there is provided an inexpensive, heavy duty, cold forming machine suitable for mass production of a wide variety of different precision parts and suitable for use on the floor of an ordinary factory building. The vertically elongated slide of applicant's machine is accurately guided for reciprocation in a direction inclined substantially relative to the vertical and is open at the front and the rear to accommodate the knuckles and actuating members of the toggle mechanism. The frame of the press is designed so that it may be made by welding and the parts thereof machined and assembled with the necessary accuracy at low cost. Wear and distoration of the parts is minimized. The gear frame is separate from the press frame so that close tolerances may be maintained in the gear train at all times and is constructed to facilitate assembly and disassembly of the press and replacement of worn parts.

The knuckle press of this invention employs a double stroke so that close tolerances may be maintained particularly when deforming steel or other resilient material. Means are provided for adjusting the eccentric drive of the toggle mechanism to vary the length of the stroke substantially. It is also preferable to provide change-speed gear means for readily adjusting the speed of the press in accordance with the type of operation being performed therein.

A major advantage of the cold forming machine of this invention is the ease with which it may be made and assembled with precision.

Heretofore, cold forming machines had frames formed by castings weighing many tons which had to be machined to within plus or minus one thousandth of an inch. Such accuracy could not be maintained easily after shipping from the manufacturer to the final destination because of the tendency for the casting to warp or become distorted, and it was, therefore, necessary to employ riggers or other highly skilled men to zero in the working parts and to obtain satisfactory tolerances.

The press of this invention is designed and constructed using an entirely different approach. It is no longer necessary to employ large castings, to machine such castings with precision, and to assemble and disassemble the press before shipping in order to obtain the necessary precision. The frame of the press is divided into a few simple, inexpensive subassemblies, such as a base, a gear frame, and a press frame, which may readily be assembled and disassembled by the customer without riggers or other highly trained personnel. This is possible because of the novel arrangement of removable spacers on each subassembly which are accurately machined to a predetermined reference plane so as to fit properly against similar spacers on the adjacent subassembly. Other advantages of the new press are described hereinafter.

An object of the invention is to provide a simple, inexpensive, cold forming machine suitable for a large number of different pressing and cutting operations and capable of applying extremely high pressures.

A further object of the invention is to provide a high speed, cold forming machine of high tonnage capacity which may be easily built with a high degree of precision.

A still further object of the invention is to provide a heavy duty, cold forming machine having reliable control over the pressure applied to the work during the working cycle.

Another object of the invention is to provide a high capacity press having components which can be manufactured at low cost in small factories at different locations and which can be assembled with the required precision by the customer following simple written instructions without assistance from riggers or other highly skilled persons.

A further object of the invention is to provide a versatile, cold forging machine of high tonnage capacity and low overall height which may be mounted on a flat floor and employed in existing factory buildings without reconstructing the building or reinforcing the floor and which may readily be moved to different locations in the factory.

Another object of the invention is to provide a heavy duty, knuckle press which has a capacity of several hundred tons and operates at high speed with a minimum amount of noise and wear and a high degree of accuracy.

Another object of the invention is to provide a heavy duty knuckle press having a maximum stroke for a given height.

A further object of the invention is to minimize the cocking and vibration of the reciprocating slide of a heavy duty knuckle press and the wear caused by reciprocation of said slide.

A still further object of the invention is to construct a press so as to minimize inaccuracies in the manufacture of metal parts due to expansion of parts of the press or resilience of the metal parts.

Another object of the invention is to provide the ram of a high speed press with a rapid advance and a slow work speed.

Another object of the invention is to provide a simple cold forging press which may be operated at slower working speeds when forming soft metal parts than when forming hard metal parts and which mass produces such parts at minimum cost.

Another object of the invention is to provide a simple, inexpensive, heavy-duty knuckle press wherein the speed of the ram during the working stroke may be adjusted a substantial amount without changing the speed of the power train.

Another object of the invention is to provide a cold forging machine whose stroke may readily be adjusted over a substantial range.

Another object of the invention is to provide a heavy duty cold forming machine having a toggle mechanism with a double stroke which may be adjusted.

A further object of the invention is to provide a cold forging machine having a gear train whose parts may easily be removed and replaced without disturbing the main elements of the machine.

Another object of the invention is to provide a versatile press for use with punches, dies, transfer mechanisms, and ejector mechanisms which permits changing the number and location of stations along the line of feed.

Another object of the invention is to provide means for holding transfer mechanism in an inclined position to improve the operation thereof.

Another object of the invention is to provide a small, inexpensive, heavy duty press of simple welded construction.

Another object of the invention is to provide a simple high speed toggle mechanism capable of applying forces of several hundred tons without excessive wear or deformation.

Other objects, uses and advantages of the invention will become apparent to those skilled in the art from the following description and claims and from the drawings in which:

FIGURE 2 is a front elevational view taken substantially on the line 2—2 of FIGURE 1 and on the same scale with parts omitted and parts broken away as in FIGURE 1;

FIGURE 3 is a fragmentary side elevational view showing a portion of the press on a larger scale with parts broken away and shown in section;

FIGURE 4 is a schematic side elevational view with parts of the press separated, the common reference plane being illustrated in dot-dash lines;

FIGURE 5 is a fragmentary rear elevational view of the press;

FIGURE 6 is a fragmentary end view taken on the line 6—6 of FIGURE 5 with parts omitted;

FIGURE 7 is a fragmentary sectional view taken substantially on the line 7—7 of FIGURE 6;

FIGURE 8 is a fragmentary vertical sectional view taken substantially on the line 8—8 of FIGURE 5;

FIGURE 13 is an end elevational view with parts broken away and with parts omitted showing the toggle mechanism, the moved position of the eccentric arm being shown in dot-dash lines;

FIGURE 14 is a fragmentary, horizontal sectional view taken substantially on the line 14—14 of FIGURE 13; and FIGURE 15 is a graph illustrating the operation of the double-stroke toggle mechanism of the press.

Figure 1:
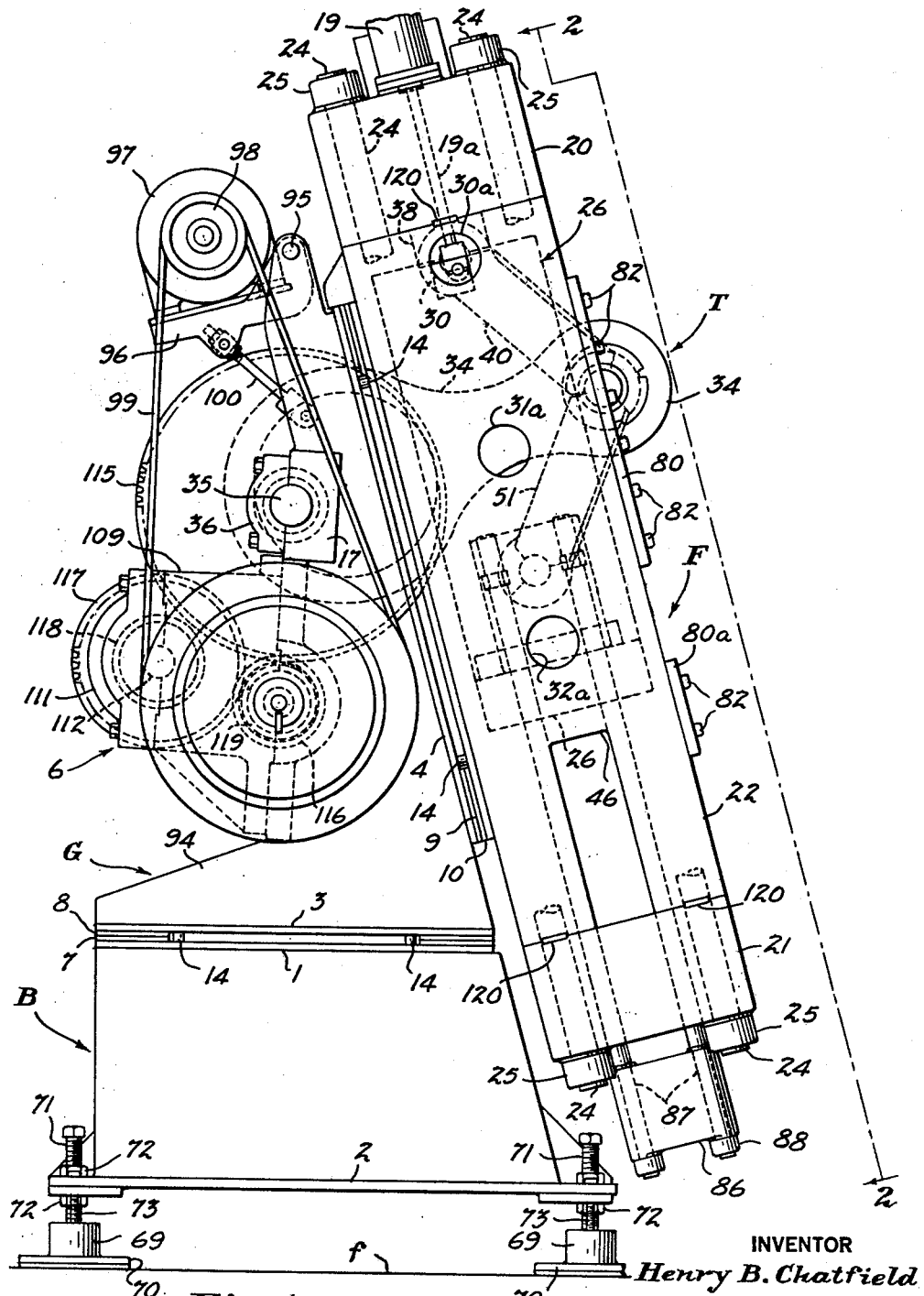
FIGURE 1 is a side elevational view on a reduced scale showing a 600-ton toggle press constructed according to the present invention with parts omitted.

Referring more particularly to the drawings which are drawn substantially to scale and in which like parts are identified by the same numerals throughout the several views, FIGURES 1 and 4 show an end view of one form of a toggle press constructed according to the present invention and having a rigid metal base B, a rigid metal gear frame G rigidly mounted on said base, a rigid metal press frame F mounted on the gear frame, and a novel double-stroke toggle mechanism T for operating the ram of the press. The base B has flat top and bottom plates 1 and 2, and the gear frame G has similar plates 3 and 4. The plate 4 stands upright and is similar to a flat plate 5 carried by the frame F. The base B is provided with four small flat truing plates 7 at the four corners of the plate 1, and the frame G is provided with four similar truing plates 8 vertically aligned with the plates 7. The upright plate 4 is provided with four truing plates 9 at the four corners thereof, and the plate 5 is similarly provided with four truing plates 10.

The plates 10 are held in place by holding screws 11 as shown in FIGURE 3, and the plates 9 are rigidly held in place on the plate 4 by screws 12. The truing plates 7 and 8 are similarly mounted on the plates 1 and 3, respectively, whereby the plates 7 are rigidly carried by the base B and the plates 8 are rigidly carried by the frame G. The gear frame G is rigidly and detachably connected to the base B and the frame F by a series of bolts 14 and nuts 13 or other suitable connecting means. The projecting portions 15 of the frame F rest on the top of the plate 4 as shown in FIGURE 3 to support the weight of the press frame. The gear frame also has an upwardly projecting lug 16, a main shaft bearing 17, and a drive shaft bearing 18.

The inclined press frame F is shown schematically in FIGURE 4 with the parts omitted for convenience. This frame is shown in detail in the other figures of the drawing and includes a crown 20, a bed 21, and a pair of uprights 22 and 23 extending between the crown and the bed and perpendicular thereto. Locating keys 120 are provided at opposite ends of each upright to provide a high degree of accuracy. These main parts are made of steel and are held together by four steel tie rods 24 having nuts 25 at opposite ends thereof. The tie rods extend all the way through the crown, the uprights and the bed and have threaded portions extending above the crown and below the bed for receiving the nuts 25. Said nuts are preferably tightened while the tie rods are hot so as to place the tie rods under tension when they are cooled.

A vertically elongated slide 26 is mounted for vertical movement between the uprights 22 and 23 and is caused to reciprocate by a double-stroke toggle mechanism T having a long stroke, double geared, double eccentric drive at 6. The knuckle assembly 27 of the toggle mechanism includes wide heavy upper and lower knuckle members 28 and 29, an upper knuckle shaft 30, a central knuckle shaft 31, and a lower knuckle shaft 32. The shaft 30 is thus mounted on the press frame above the upper portion of the slide 26 and the shaft 32 is mounted on the lower portion of the slide (see FIGURE 11), the knuckle members 28 and 29 being located between the side walls of the slide (see FIGURES 1 and 2). The means for operating the knuckles includes eccentric portions 33 of the main gears, eccentric connecting arms 34, and a main shaft 35 drivingly connected to said main gears. Said shaft is held on the bearing portions 17 by bearing caps 36 which are detachably and rigidly connected to the gear frame G.

The crown is provided with a pair of downwardly projecting bearing supports or lugs 38 and a compression portion 38a which fits against a semi-cylindrical bearing bushing 39 as shown in FIGURE 13. The cylindrical bushing 39 and a similar bearing bushing 37 mounted on the knuckle 28 engage the shaft 30 and receive the compressive forces. A pair of links 40 are provided at opposite ends of the wide knuckle 28 to provide a pivotal connection between the shaft 30 and the shaft 31, and a pair of flat links 51 are provided at the opposite ends of the knuckle 29 to provide a pivotal connection between the shaft 31 and the shaft 32. If desired, the links 40 and 51, respectively, may be provided with cylindrical bushings 140 and 151 for engaging the shafts. The links 40 have a Z-shaped cross-section as indicated in FIGURE 2 to accommodate the links 51 and the lugs 38. The kunckle has another cylindrical bearing segment 37 for engaging the shaft 31.

The members 28 and 29 are relatively wide and relatively thick so as to take the tremendous compressive force generated in the press without bending the shafts 30, 31 and 32. As herein shown, said members are elongated horizontally and are provided with grooves 49 and associated ribs, but it will be apparent that the shape of such members may vary considerably. The knuckle members 28 and 29 are pivotally connected to the shaft 31 which is parallel to and midway between the horizontal shafts 30 and 32 which are parallel to the main shaft 35. The bushings 37 and 55 of the two knuckle members engage the shaft 31 along the full length of said members to reduce the wear and to absorb the compressive forces. The length of each knuckle member is substantially greater than half the length of the shafts 30 and 32.

Figure 9:
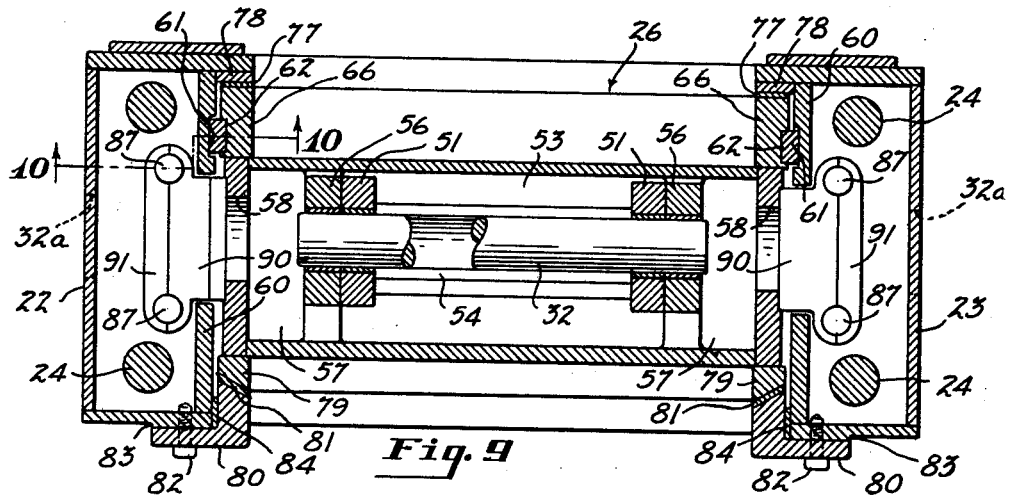
FIGURE 9 is a fragmentary sectional view of the press frame taken substantially on the line 9—9 of FIGURE 11.

The pivotal connection between the lower parts of the knuckle assemble 27 and the shaft 32 are similar to the pivotal connections to the shaft 30 which have been described above. The slide 26 has a bearing support 53 rigidly mounted thereon to support the semi-cylindrical bushing 54 coaxial with the lower bushing 55 of the knuckle member 29. Said support 53 has lugs 56 surrounding the shaft 32 to hold the shaft on the slide during retraction thereof. A pair of end blocks 57 are provided at opposite ends of the shaft 32 as shown in FIGURE 9, and circular openings 58 are provided in the opposite end portions of the slide to permit removal of the shaft 32 through one of said openings and one of the openings 32a of the uprights.

The slide 26 is mounted for vertical sliding movement between the uprights and is caused to reciprocate by the toggle mechanism described above. Suitable bearing means are provided to reduce the wear and the friction and to accurately locate the slide during its reciprocation. As herein shown, the uprights 22 and 23 have flat vertical inner plates 60 having grooves 61 which provide the way surfaces at the rear of the slide. Such surfaces engage the flat vertical surface of wedge-shaped bronze bearing bars 62 which preferably have a vertical height more than 20 times their thickness. Each bar 62 has a horizontal lug 63 which receives a vertical adjusting screw 64. Said screw is received by an internally threaded hole in the horizontal portion 65 of the slide. The vertical portion 66 of the slide is tapered like the bar 62 so as to engage the bar from the portion 65 to the bottom of said bar along the flat inclined surface 67. The bar 62 and the portion 66 fit together so that the surface of said bar engaging the plate 60 is vertical. It is thus possible to adjust the position of the slide toward or away from the upright 22 while at the same time maintaining the slide parallel to the upright. Such construction is unusual since it permits adjustment of the frame to the slide and is very advantageous.

Flat strips 77 of suitable bearing metal are provided between the flat rear surface of each portion 66 and the flat surface of the bearing strip 78 carried by the upright. This bearing strip reduces the friction and wear at the rear of the slide and receives the weight of the slide due to the inclination of the press frame, which is herein shown as being about 15 degrees relative to the vertical.

At the front of the slide, tapered bearing portions 79 are provided which are rigidly connected to the slide like the portion 66. These bearing portions have a cross section as shown in FIGURE 9. A pair of vertically elongated metal gibs 80 are rigidly and detachably mounted on the front of the uprights 22 and 23 by means of a multiplicity of hex-head screws 82. These gibs have a shape complementary to that of the portion 79 so that bronze baring strips 81 of uniform thickness may be inserted between the gibs and the slide. Due to the inclination of these bearing strips, the outer portion of the slide is held against movement in two directions. Shims 83 or other suitable means may be provided for adjusting the position of the gibs 80. Wear strips 84 may also be provided between the inwardly projecting portions of the gibs and the plates 60.

A relatively thick, flat, upper platen 41 is rigidly mounted on the bottom of the slide 26 with its bottom surface 42 located in a plane perpendicular to the medial plane of the press frame F or, in other words, inclined at an angle of 15° relative to the horizontal. This platen has a series of tool-receiving slots 45 extending the full distance between the uprights 22 and 23 so as to permit the mounting of various punches and dies on the press. Similar tool-receiving slots may also be provided in the upper surface of the bed 21 which is parallel to the surface 42. The punches and dies may be of the conventional type.

The material to be worked on may be fed parallel to the tool-receiving slots of the upper and lower platens through the openings 46 in the uprights at the opposite sides of the press frame. The article to be operated upon in the press may, for example, be formed from a wire drawn through a wire drawing mechanism, cut to size in a cutting mechanism of the general type and well known in the art, and fed to a series of dies by a suitable transfer device as disclosed, for example, in my Patent No. 2,851,- 979 or other known transfer mechanisms as disclosed, for in Patent example, Nos. 2,728,318 and 2,998,887. My press shown herein is very versatile and is constructed to permit adjusting the number of stations (i.e., the number of punches, dies, transfer fingers, top and bottom ejectors, etc.) between the uprights 22 and 23. Although I prefer my novel tooling for the press which permits automatic operation, such tooling is not illustrated since it is not claimed herein and since conventional tools may obviously be employed with or without automatic feeding.

It should be noted that the press frame F has a large rectangular opening 47 between the ram surface 42 and the bed 21 and between the uprights 22 and 23 to permit access to the punches, dies, transfer devices, etc., which may be employed with the press.

As herein shown, a knock-out rail 43 is supported between the uprights by a pair of brackets 44 located below the gibs 80 and having a similar cross section. These brackets and the gib extensions 80a have the same cross section as the gibs 80 as indicated in FIGURE 9 so as to engage the strips 81, which extend from the top of the gibs 80 to the bottom of the gibs 80a. The slide is thus in engagement with the bearing strips 77, 62 and 81 throughout the full stroke of the ram.

The knock-out bar 43 may be employed, when punches and dies are used on the press, to separate the punch or die from the work during retraction of the ram. It will be understood that various extraction or stripper means may be employed on the press as is well understood in the art.

The press may be provided with suitable means for ejecting the articles from dies mounted on the bed 21. As herein shown, an ejector member 86 is supported below the bed 21 by four pull-back pins 87, the downward movement of the member 86 being limited by the four nuts 88. The upper part of each pull-back pin 87 has a reduced portion 89 which interfits with a supporting member 90 and a clamp 91 that is rigidly and detachably connected to the member 90. Each member 90 is rigidly connected to the slide 26 for movement in unison therewith. The rods 87 and the ejector member 86, therefore, move upwardly and downwardly in unison with the slide.

The base B is shown in more detail in FIGURES 1 and 2. It includes four foot members 69, each being located at a corner of the base and having a pad 70 for engaging the floor f. Leveling screws 71 extend through the corners of the bottom plate 2 and are screwed into the foot member 69 to support the weight of the press. The position of the plate 2 relative to the leveling screw is adjusted by means of the locking nuts 72 so that the plate 2 may be located accurately in a horizontal plane. It is preferable to provide two vertical guide bolts 73 on opposite sides of each screw 71 to guide the foot member 69 vertically while preventing rotation thereof when the screw is turned.

The gear frame G has an upper portion 93 supported by the two vertical side portions 94. A pivot pin 95 is mounted in the upwardly projecting portion 16 of one of the side portions of the frame and provides a pivotal connection for a motor support 96 which carries a powerful electric motor 97 (i.e., 100 to 200 horsepower). The shaft of said motor is connected to a sheave 98 having grooves which receive a series of V-belts 99. The tension of the belts may be adjusted by adjusting the position of the adjusting rod 100 which is interposed between the support 96 and the side portion 94 as shown in FIGURE 1.

The V-belts are mounted in the grooves of a heavy flywheel 101 which is mounted on the drive shaft 105 next to a pneumatic clutch 102. Air under pressure is supplied to the clutch through the supply line 103. At the opposite end of the drive shaft fluid is supplied to a flywheel brake 106 through a supply line 107. The clutch 102 permits stopping or starting of the press at any time without stopping the electric motor, and the brake 106 stops the press when the flywheel reaches an excessive speed. Such mechanism permits operation of the press at very slow speeds or reciprocation of the ram through short distances.

The drive shaft 105 is supported in a horizontal position parallel to the main shaft 35 by bearings 108 and 108a in the side portions of the gear frame. These bearings are covered by large supporting brackets 109 having semi-cylindrical bearing portions 110 coaxial with the bearing portions 18. A pair of bearing caps 111 are rigidly and detachably connected to the members 109 to provide a support for an intermediate shaft 112 which is parallel to the shafts 35 and 105. Said bearing caps hold the bearings 113 of the intermediate shaft in position.

Change speed gearing is provided to transmit the power from the drive shaft 105 to the main shaft 35. As herein shown, such gearing includes a pair of main eccentric gears 115 mounted on the main shaft 35 between the eccentric arms 34 of the toggle mechanism, an intermediate gear 117 mounted on the intermediate shaft 112 midway between the gears 115, a pair of pinion gears 118 mounted on the intermediate shaft on opposite sides of the gear 117 and adapted to mesh with the gears 115, a pair of main pinion gears 116 mounted on the drive shaft 105, and a pinion gear 119 mounted on the drive shaft 105 midway between the pinions 116.

The change speed gearing 6 provides two different speeds of operation without removing gears from the machine. The change in speeds is effected by shifting the position of the drive shaft 105 and the intermediate shaft 112. When the shafts are adjusted to cause the pinions 116 to mesh with the gears 115 and to move the pinions 118 out of contact with said gears 115, then one speed of operation is obtained. A second speed of operation is obtained when the drive shaft is adjusted so that the pinions 116 are out of contact with the gears 115, the intermediate gear 117 is in mesh with its pinion 119, and the pinions 118 are in mesh with the gears 115.

The change in the position of the shafts 105 and 112 may obviously be effected different ways, but it is preferred to change the position without removing any large parts from the machine and without the use of special tools. As herein shown, the bearing 108 is provided with an eccentric bearing carrier 121 having an internal surface concentric to the shaft 105 and engaging the roller bearings 122 and having an external surface of revolution arranged in an eccentric manner whereby rotation of the carrier 121 moves the shaft 105 while maintaining such shaft parallel to the main shaft 35. The brake 106 has a flat vertical plate 123 which is provided with outwardly projecting portions 124 on opposite sides of the brake as shown in FIGURES 6 and 7. Each portion 124 has a notch 125 of a size to receive a locking member or key 126 which is detachably connected to the gear frame by screws 127. It is thus possible to lock the plate 123 and the bearing carrier 121 in the position shown in FIGURES 6 and 7 or to lock these parts in a position spaced 180 degrees from that position. The adjustable bearings 108a, 113 and 48 function in a similar manner to permit adjustment of the position of a shaft while maintaining the axis of the shaft parallel to a fixed axis.

The adjustable bearing 108a includes an eccentric bearing carrier 129 similar to the carrier 121 but having two diametrically opposed notches 130 therein, each of a size to receive a locking member or key 131. Such key may be mounted in either of the notches and rigidly connected to the portion 18 of the gear frame by a pair of screws 132.

Each of the two adjustable bearings 113 of the intermediate shaft is constructed in the same manner and includes an eccentric bearing carrier 134 similar to the carrier 129 and having two notches 135 which are diametrically opposed like the notches 130 and are of a size to receive a locking member 136. Such locking member is rigidly and detachably connected to the member 109 by a pair of screws 137 whereby the bearing carrier 134 may be locked in the position shown in the drawings or in a position spaced 180 degrees therefrom.

It will be understood that the adjustable bearings 108 and 108a of the drive shaft 105 are constructed to hold the shaft 105 parallel to the main shaft 35 in each of the adjusted positions of the shaft. Only two adjusted positions are required in the change speed gearing 6 shown herein, but it will be understood that other gearing arrangements may be employed which require more adjustments of the shafts.

It will also be understood that the two adjustable bearings 113 permit holding of the intermediate shaft 112 in two different adjusted positions parallel to the main shaft 35.

The two adjustable bearings 48 at opposite sides of the toggle mechanism T may be constructed similar to the adjustable bearings 108 and 113. As herein shown, each bearing 48 includes an eccentric bearing carrier 156 having an internal cylindrical surface concentric to the shaft 31 and engaging the external cylindrical surface of its bushing 255 and having an external cylindrical surface of the same diameter as the internal cylindrical surface 234 of the eccentric arm 34. The axis of the external cylindrical surface of the bearing carrier 156 is parallel to but spaced from the axis of its internal cylindrical surface so that it functions like the bearing carriers 121 and 134. The flange 157 of the bearing carrier 156 engages the flat outer surface of the arm 34 as shown in FIGURE 14 and is provided with three notches 158, each of a size to receive the projecting portion of a locking member 159. Two of said notches are diametrically opposed to permit maximum adjustment of the shaft. Said locking member is rigidly and detachably connected to the arm 34 by a pair of screws 160. One adjustable bearing 48 is provided at each arm 34 on opposite sides of the knuckle assembly 27 so that the shaft 31 is always held parallel to the shafts 30 and 32. It will be understood that means may be provided for holding the eccentric bearing carrier 156 in two to six different adjusted positions rather than in three positions if finer adjustments are desired. It is usually unnecessary, however, to have more than three adjustable positions for the shaft 31.

It is preferable to drive several accessories from the main shaft particularly when it is necessary to perform operations in synchronism with the operation of the press. Various means may be provided for transmitting the power from the main shaft to the transfer devices, cut-off devices, feeding devices or other accessories. As herein shown, a pair of sheaves 147 are mounted on the end of the shaft 35 to drive a lower sheave 148 by means of conventional V-belts 149. A similar V-belt 142 extends around an upper pulley 143 carried by the drive shaft and a lower pulley 144 carried by the transfer drive shaft 145. The latter shaft is mounted for rotation in bearings 146 carried by the gear frame.

The various parts of the knuckle press of this invention may be machined and inspected to obtain a very high degree of accuracy. A major subassembly such as the press frame F is preferably constructed so that the surfaces of the crown 20 which mate with the uprights are in precisely the same plane and so that the axis of the shaft 30 will be supported by the bearing supports 38 and 38a exactly parallel to the upright mounting surfaces. The top and bottom machined surfaces of the bed 21 should be parallel, and the tool slot therein should be true front-to-back and right-to-left. The bottom of the tool slot should be parallel to the top surface of the bed. The same is true for the platen 41 and its tool slots.

Special attention is preferably given to the machining of the uprights 22 and 23 to provide squareness, parallelism and alignment. All vertical surfaces are made square or parallel with each other, as the case may be. The top and bottom surfaces are preferably machined together to assure that they are parallel and of equal height (zero tolerance).

Special attention is also given to the machining of the slide 26 to provide squareness, parallelism and alignment. The slide face should be perpendicular to the back slide ways and the front ways should be parallel to the back ways to permit accurate gib adjustment. Furthermore, the bearing bushings 54 are accurately located to support the shaft 32 parallel with the slide face so that the shafts 30 and 32 will be exactly parallel when the press frame is assembled.

The wide knuckle members 28 and 29 are preferably line bored in a single piece of metal and then severed by a saw or mill so as to obtain accuracy and symmetry. The ends are then milled to final angular dimensions.

The upper and lower links 40 and 51 are preferably bored in pairs. This may be done by strap welding like pairs together before boring and severing the links on completion of the boring. The center distance of the bores is identical to that of the knuckles.

The bearing carriers for the knuckles are designed to facilitate assembly of the knuckle and link bearings to zero accuracy.

When the press frame F is assembled the shafts 30, 31 and 32 are in horizontal positions parallel to each other and to the faces of the slide and parallel to the predetermined reference plane a—a. The frame is preferably assembled in a horizontal position with the back mounting surfaces of the uprights positioned downward and supported on rails which have been leveled precisely. The bed is brought into position and keyed to the bottom end of the uprights. The crown is next positioned and keyed to the top end of the uprights. The tie rods 24 are then installed and tightened sufficiently to bring all components into their normal assembled positions. The assembly may then be checked out completely and adjusted to zero out all variations created by accumulated tolerances. The way surfaces on the back inside of the right and left uprights should be in exactly the same plane from bottom to top and from left to right for their entire length. The top surface of the bed should be square to the way surfaces within .001 inch. The bearing carriers of the crown should be properly located to support the axis of the shaft 30 within .001 inch of being square with the way surfaces and within .002 inch of being parallel with the top of the bed. The frame F may be assembled so that the knuckle pin 30 is exactly parallel (zero tolerance) in both vertical and horizontal planes to the hardened steel ways and to the bed top.

After the frame has been zeroed in, the tie rods 24 may be shrunk in .1 inch or so and thereby placed under tension. Helical heating rods may be inserted into the drilled ends of the rods to heat the two opposite across-corner rods and the tie rod nuts 25 tightened the required amount. The remaining tie rods may then be heated and the nuts tightened in a similar manner, whereby the rods support the load equally when they are cooled to room temperature.

The gear case assembly G is also carefully machined and inspected. Before boring the bearing mounting holes for the main shaft 35, the drive shaft 105 and the intermediate shaft 112 and before machining of the base surfaces at plane b—b and the frame mounting surfaces at plane a—a, the parts 109, 111 and 36 are bolted in place on the gear frame. The mating surfaces may be keyed and bolted together so that the high accuracy can be attained. The bores for the shafts 35, 105 and 112 should be exactly parallel to each other and to the predetermined planes a—a and b—b as shown in FIGURE 4.

The main gears 115 are machined very accurately. The throws of the two gears should not differ by more than .001 inch.

The pinions and gears of the change speed gearing 6 are machined with a high degree of accuracy to provide precisely matched pairs. The running clearance of the helical gears and their pinions is preferably not substantially greater than .01 inch.

The final assembly of the knuckle press of this invention by the customer is relatively simple since the truing plates or pads of each of the major subassemblies B, F and G are accurately machined to a predetermined reference plane. The base B may readily be placed upon a floor and adjusted so that the upper surfaces of the truing plates 7 are located exactly in a predetermined horizontal plane b—b as indicated in the exploded view of FIGURE 4. Since the truing plates 8 and 9 of the gear frame G are accurately machined so as to be located in predetermined planes a—a and b—b which are located at an angle of 75 degrees relative to each other parallel to the shafts 35, 105 and 112, the outer mounting surfaces of the plates 9 will be located in exactly the right position for receiving the press frame F when the gear frame is mounted on the base B. When the press frame is bolted to the gear frame as indicated in FIGURE 1, the inclined rear surfaces of the slide 26 at the bearing strips 77 are parallel to the predetermined plane a—a, and the knuckle pins 30, 31 and 32 are parallel to the shafts 35, 105 and 112.

Figures 10, 11:
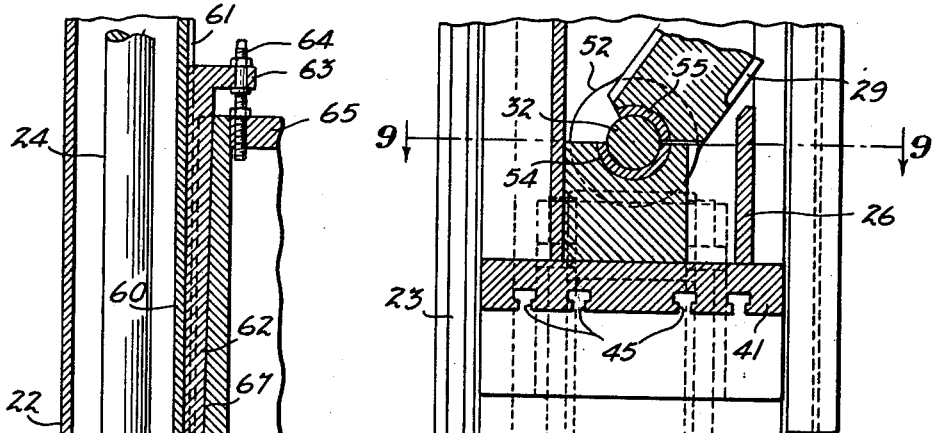
FIGURE 10 is a fragmentary vertical sectional view taken substantially on the line 10—10 of FIGURE 9 with parts broken away.
FIGURE 11 is a fragmentary sectional view taken substantially on the line 11—11 of FIGURE 2.
Figure 12:
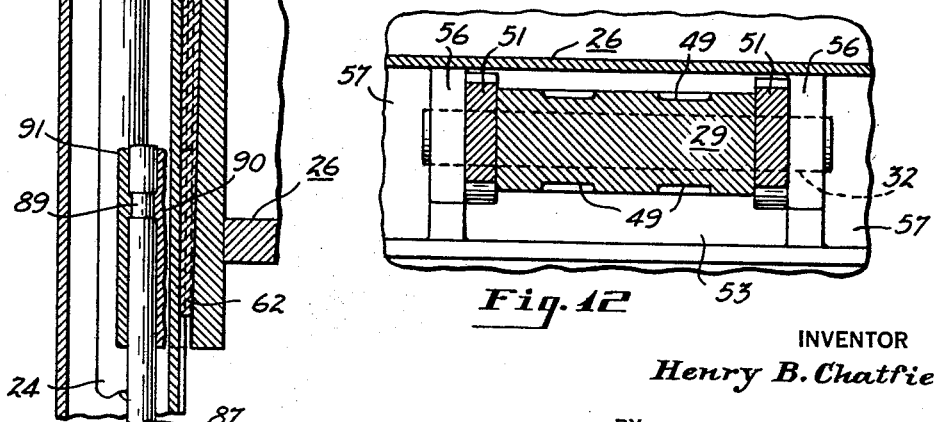
FIGURE 12 is a fragmentary sectional view taken substantially on the line 12—12 of FIGURE 13.

The position of the slide 26 in the press frame F may be adjusted to obtain most efficient operation. The preferred method is to adjust the frame relative to the slide rather than to adjust the slide to the frame. The position of the wedge-shaped bars 62 is preferably determined by permitting the slide to reach its natural position with the members 62 elevated to provide a loose fit and thereafter to lower the bar 62 to a position as shown in FIGURE 10 wherein the slide is held in its natural position.

The amount of clearance at the bearing strips 77 and 81 may be adjusted by adjusting the position of the gibs 80 and 80a. The inclined position of the strips 81 enables the gibs to limit side to side movement of the slide as well as movement in a perpendicular direction.

The operation of the power train will be apparent from the drawings. In order to permit operation of the press at one speed, the shaft 105 is located so that the pinions 116 thereof mesh with the main helical gears 115. The rotation of the gears 115 causes the arms 34 mounted on the eccentric portions 33 of the gears to move from the position shown in solid lines in FIGURE 13 to the position shown in dot-dash lines in that figure. The resulting outward movement of the knuckle pin 31 raises the slide 26 to its uppermost position as shown in FIG- URE 1. The slide is reciprocated once during each revolution of the main shaft 35. If it is desired to change the speed of movement of the slide 26, the shaft 105 is moved away from the shaft 35 by releasing the locking members 126 and 131 and rotating the eccentric bearing carriers 121 and 129 one-half revolution. The members 126 and 131 are again bolted in position in their respective notches so that the drive shaft is held parallel to the main shaft with its pinions 116 out of engagement with the gears 115. When the parts are in these positions, the drive shaft 105 may be rotated without operating the ram of the press.

The ram may be driven at a different speed by moving the intermediate shaft 112 toward the shaft 35 so that the pinions 118 of the intermediate shaft are in mesh with the main gears 115 and so that the intermediate gear 117 is in mesh with the pinion 119 of the drive shaft. This is accomplished by removing the locking members 136 from the notches 135 of the bearings 113 at opposite ends of the shaft 112, rotating the eccentrics 134 one-half turn, reinserting the locking members 136, and tightening the screws 137 to lock the locking members in place. When the two bearings 113 are so adjusted the shaft 112 is parallel to the shafts 35 and 105 and the power is transmitted from the drive shaft 105 through the intermediate shaft 112 to the main gears 115. The main shaft 35 is not subjected to torsional stresses since the eccentrics 33 are integral parts of the main gears.

When the eccentrics 134 are again rotated 180 degrees to move the shaft 112 away from the main shaft, the pinions 118 are out of contact with the main gears and the gear 117 is out of contact with the pinion gear 119.

It is thus seen that the gearing 6 may readily be adjusted to provide two different speeds for the ram 26 for a given speed of the drive shaft 105 without removing and replacing any gears. The tension in the V-belt drive may readily be adjusted by adjusting the position of the support 96 or in any other conventional manner to accommodate movement of the shaft 105 if such adjustment is desired.

It is easy to remove the V-belts and to remove the shafts 35, 105 and 112 and the gears thereon as will be apparent from FIGURES 1 and 5. Since the power train is located at the rear of the press, conventional fork lift trucks may be employed to support the weight of the parts being removed.

The use of double gears provides balance and minimizes noise, vibration and wear of the parts.

The distance from the center of each eccentric 33 to the axis of the knuckle pin 31, when the eccentric 33 is in the position shown in solid lines in FIGURE 13 with its center in line with the axis of the shafts 31 and 35, is preferably less than the distance from said center of the eccentric 33 to the plane containing the axes of the knuckle pins 30 and 32, whereby the press has a double stroke. With such a construction the slide 26 is moved from the top of its stroke to the bottom of its stroke before the drive shaft 35 has rotated 180 degrees and is retracted a fraction of an inch when the rotation of said shaft approaches 180 degrees and the axis of the knuckle pin 31 comes closest to the shaft 35. The movement of the slide 26 is illustrated in FIGURE 15 in which the abscissa is the angular position of the main shaft 35 and the ordinate is the displacement of the slide above bottom dead center. The curve shown in dotted lines in FIGURE 15 illustrates the movement of the slide when the parts are so constructed that the distance from the axis of the pin 31 to the plane containing the axes of the pins 30 and 32 is only a small fraction of an inch (i.e., 0.2 inch) at the instant the parts are in the position shown in FIGURE 13.

It is preferable to provide means for adjusting the distance between the axes of the shafts 31 and 35 so that the stroke of the ram and the amount of retraction of the ram, at 180 degrees rotation of the drive shaft, may be adjusted substantially. The curve shown in solid lines in FIGURE 15 shows the movement of the slide when the distance between the axes of the shafts 31 and 35 have been adjusted so that the axis of the shaft 31 moves more than one inch (i.e., 2 inches) beyond the plane containing the axes of the shafts 30 and 32 in a direction toward the main shaft.

A structure of the type illustrated in FIGURES 13 and 14 may be employed to move the shaft 31 up to 3 inches relative to the shaft 35. When it is desired to adjust the toggle mechanism, the two locking members 159 are removed from the associated notches 158 of the flanges 157 at opposite ends of the knuckle shaft 31, and the two eccentric bearing carriers 156 are turned 180 degrees to place the notches 158 in position to receive the locking members 159. Said locking members may thereafter be locked in position by the screws 160 so that the knuckle shaft 31 is held parallel to the shaft 35 and the shafts 30 and 32. When the eccentric 33 and the arm 34 is in the position shown in solid lines in FIGURE 13, the axis of the knuckle shaft 31 may either be only 0.1 to 0.3 inch from the plane containing the axis of the shafts 30 and 32 or may be 1 to 3 inches from said plane depending upon the position of the bearing carriers 156. As herein shown, the bearing carriers are constructed so that the axis of the shaft 31 is between the shaft 35 and the aforesaid plane and spaced from said plane when the eccentric 33 is in the position shown in solid lines in FIGURE 13, whereby the press has a double stroke in all adjusted positions of the toggle mechanism, but it will be understood that the toggle mechanism could be adjusted to eliminate the double stroke. The latter would be undesirable, however, since it would be difficult to form steel parts with a high degree of accuracy due to the tendency of the metal to spring back just after the ram reached the bottom of its stroke. It would, however, permit an increase in the stroke of the ram.

The toggle mechanism and other parts of the press of this invention are drawn to scale to facilitate an understanding of the invention, but it will be understood that the size and shape of the parts may vary considerably. In a 600-ton or 800-ton knuckle press, for example, the parts would be larger than shown in the drawings.

Usually a press constructed according to the present invention has a maximum stroke of 8 to 20 inches, and the axis of the shaft 31 moves inwardly past the plane containing the axes of the shafts 30 and 32 a distance no more than one-third of said maximum stroke. It is preferable to provide means for adjusting the distance between the knuckle shaft 31 and the main shaft 35 so that such distance may be changed at least 2 inches and no more than one-third the maximum stroke of the press. In all adjusted positions of the knuckle pin 31 the axis of said pin preferably moves inwardly beyond the top dead center position to affect a double stroke, and the displacement $x$ of the slide at the middle of a cycle (the maximum retraction during the second stroke) is usually 0.1 to 0.4 inch. The amount of adjustment of the distance $x$ due to the adjustment of the shaft 31 relative to the shaft 35 is preferably at least 0.1 inch.

The toggle mechanism of this invention is constructed to operate efficiently at high speed when subjected to extremely high forces. The mechanism is balanced to minimize noise and wear of the parts, and the knuckle members 28 and 29 are relatively thick to transmit forces of several hundred tons. The thickness of each knuckle member 28 and 29 is usually 0.2 to 0.3 times the width of the knuckle member, and the length of the knuckle member is usually 1.2 to 2 times its width. Each knuckle member engages the shaft 30 or the shaft 32 along substantially more than half of the length of the shaft to minimize deflection of the shafts. The high forces applied to the knuckles do not distort the shafts or gears of the power train carried by the frame G since the forces are taken up by the frame F. Likewise, these high forces are not exerted against the base B or against the floor.

The knuckle members 28 and 29 preferably engage the shafts 30, 31 and 32 throughout at least two-thirds the length of each shaft so that maximum forces can be applied without causing excessive wear or distortion of the parts.

The extremely wide knuckles, driven from both ends by the eccentric, cannot twist or rock. Distortion of the parts is minimized, and extreme accuracy is imparted to the work. Tool wear due to misalignment, which is characteristic of toggle presses known prior to this invention, is eliminated. Since it is possible to apply the force at key points along the length of the knuckle without twisting or distorting the parts, the tool designer has greater flexibility in placing tools on the press.

The toggle mechanism of this invention permits high speed operation since there is a rapid advance and a relatively slow working stroke. The knuckle action is superior for working metal because of its deceleration and dwell at the bottom of a stroke. Since there is a long stroke, there is plenty of power early in the working stroke. The unusual arrangement of the parts provides control over the application of pressure which was heretofore not obtainable with knuckle presses. This control makes the machine of this invention suitable for cold forming operations which require application of extremely high pressures during one to two inches of the stroke. In cold forming operations, it is important that the motion employed to reciprocate the slide in its ways be such that the flow of metal within the dies is under pressure and velocity control. Without such control, the adhesion of the molecular slip planes fail and cause "slip shear." It is for this reason that distortion, vibration, etc., are objectionable in a cold forming machine. The present invention for the first time provides a simple knuckle press which is suitable for cold forging operations at these high pressures.

The machine of this invention, because of its rapid advance and slow work speed, can turn out a larger number of parts in a short period of time even when pressures of 600 or 800 tons are applied to the work.

The inclination of the press frame F relative to the vertical greatly improves the operation of the press. As the eccentric arms 34 pull on the knuckle pin 31 to straighten the knuckle and create the downward movement of the slide, the entire slide is held firmly against the back ways of the press frame. This construction prevents knocking or chattering of the slide which is a major cause of destructive tool wear in previously known knuckle presses. The accuracy of the movement of the slide or ram controls the work accuracy and critically affects tool life. To insure perfect alignment between the slide 26 and the bed 21, the slide has been greatly elongated, reaching the entire distance from the crown 20 to the working space. The vertical length of the slide is materially greater than its horizontal width and substantially greater than the distance between the axes of the knuckle shafts 30 and 32 when the ram is in its uppermost position as shown in FIGURE 1. Since the knuckles are telescoped within the ram, the lengthening of the slide does not increase the overall height of the machine.

The machine of this invention is designed to handle many different types of metal forming work and, therefore, is exceptionally well suited for the small manufacturer having limited funds for capital equipment. It is no longer necessary to have additional equipment designed for special operations since such operations can be performed on the press of this invention.

Having described my invention, I claim:

1. A metal working press having a capacity in the order of 100 tons or more comprising a press frame subassembly, a base subassembly, and a motive power subassembly, each of said subassemblies being characterized by at least two spacers which interfit with spacers of the corresponding subassembly and which are accurately machined and ground to a common reference plane.

2. In a metal-working press having a capacity of at least 100 tons and comprising a base having ground-engaging members, a rigid gear frame rigidly mounted on said base, an upright press frame rigidly mounted on said gear frame and having a ram mounted for reciprocations therein, means for driving said ram including a main shaft mounted on said gear frame, a drive shaft mounted on said gear frame, and meshing gears on said shafts, the improvement which comprises means for accurately locating said gear frame and said press frame relative to a common reference plane which has a predetermined position relative to the axes of said shafts, said last-named means comprising first spacer members rigidly and detachably mounted on said gear frame and having accurately machined flat outer surfaces located in said common plane, and spacer members rigidly and detachably mounted on said press frame and having accurately machined flat outer surfaces located in said common plane and engaging said first spacers.

3. A metal-working press having a capacity of several hundred tons comprising a rigid base having ground-engaging members, a rigid gear frame rigidly mounted on said base, an upright press frame rigidly mounted on said gear frame and having a ram mounted for reciprocation therein, means for driving said ram including a main shaft mounted on said gear frame, a drive shaft mounted on said gear frame, and meshing gears on said shafts, and means for accurately locating said gear frame and said press frame relative to a common reference plane which has a predetermined position relative to the axes of said shafts, said last-named means comprising first spacer members rigidly and detachably mounted on said gear frame and having accurately machined flat outer surfaces located in said common plane, and spacer members rigidly and detachably mounted on said press frame and having accurately machined flat outer surfaces located in said common plane and engaging said first spacers, and locating means for accurately positioning said gear frame and said base relative to a second predetermined reference plane, said locating means comprising spacer members rigidly and detachably mounted on the upper surfaces of said base and having flat upper surfaces located in said predetermined plane and spacer members rigidly and detachably mounted on the lower surfaces of said gear frame and having flat bottom surfaces located in said predetermined plane.

4. A metal-working press having a capacity of several hundred tons comprising a rigid base having ground-engaging members, a rigid gear frame rigidly mounted on said base, an upright press frame rigidly mounted on said gear frame and having a ram mounted for reciprocation therein, means for driving said ram including a main shaft mounted on said gear frame, a drive shaft mounted on said gear frame, and meshing gears on said shafts, and means for accurately locating said gear frame and said press frame relative to a common reference plane which has a predetermined position relative to the axes of said shafts, said last-named means comprising first spacer members rigidly and detachably mounted on said gear frame and having accurately machined flat outer surfaces located in said common plane, and spacer members rigidly and detachably mounted on said press frame and having accurately machined flat outer surfaces located in said common plane and engaging said first spacers.

5. A metal-working press having a capacity of several hundred tons comprising a rigid base having ground-engaging members, a rigid gear frame rigidly mounted on said base, an upright press frame rigidly mounted on said gear frame and having a ram mounted for reciprocations therein, means for driving said ram including a main shaft mounted on said gear frame, a drive shaft mounted on said gear frame parallel to said main shaft, and a pair of main gears mounted on said main shaft, a pair of eccentrics mounted on said main shaft at opposite sides of said main gears, a pair of pinion gears mounted on said drive shaft for drivingly engaging said main gears, and a toggle mechanism for reciprocating said ram including a knuckle and a pair of connecting arms mounted on said eccentrics and connected to the central pivot of said knuckle, and means for accurately locating said gear frame and said press frame relative to a common reference plane which has a predetermined position relative to the axes of said shafts, said last-named means comprising first spacer members rigidly and detachably mounted on said gear frame and having accurately machined flat outer surfaces located in said common plane, and spacer members rigidly and detachably mounted on said press frame and having accurately machined flat outer surfaces located in said common plane and engaging said first spacers.

6. A metal-working press having a capacity of several hundred tons and comprising a rigid base, a rigid gear frame, and a rigid press frame, said base having a series of adjustable ground-engaging members and being shaped to provide a support for said gear frame, said gear frame having means for supporting a main shaft and a driving shaft in parallel horizontal positions and being constructed to provide a support for holding said press frame in an upright inclined position, said press frame having guide means for guiding a ram upwardly and downwardly in a direction perpendicular to said shafts, and means for accurately locating said gear frame and said press frame relative to a common reference plane parallel to said shafts comprising first and second spacer means having flat outer surfaces, and means for detachably and rigidly connecting said spacer means on said gear frame and said press frame, respectively the outer surfaces of said first and second spacer means being machined accurately for engagement at said common plane when the press is assembled.

7. A knuckle press having a capacity of at least 100 tons and comprising a base, a rigid gear frame mounted on said base, a rigid press frame mounted on said gear frame and having a pair of vertically elongated parallel uprights, a crown at the upper end thereof, and a bed at the lower end thereof, said crown and said bed extending between the uprights in a direction perpendicular to the uprights, a rigid vertically elongated hollow metal slide mounted between said uprights for receprocation in a direction parallel to said uprights, which is inclined about 10 to 20 degrees relative to the vertical and toward said gear frame, said slide extending between the uprights and having guide means slidably engageable with guide means on said uprights, said slide having a length greater than twice its depth and greater than its width, toggle mechanism telescoped within said slide for reciprocating said slide comprising an upper horizontal knuckle shaft mounted on said press frame with its axis in a fixed position near the bottom of said crown and near the top of said slide, a central knuckle shaft parallel to said upper shaft, a bottom knuckle shaft mounted on the lower portion of said slide with its axis in a fixed position relative to said slide and parallel to said upper and central shafts, a first knuckle member extending between and pivotally connected to said upper shaft and said central shaft, a second knuckle member extending between and pivotally connected to said bottom shaft and said central shaft, and motor-driven means for reciprocating said central shaft including a removable main shaft rotatably mounted on said gear frame parallel to said knuckle shafts, a pair of main gears mounted on said main shaft, a removable drive shaft rotatably mounted on said gear frame under and parallel to said main shaft, a pair of pinions mounted on said drive shaft for drivingly engaging said main gears, and motor means for driving said main shaft, said gear frame having a pair of upright side portions on opposite sides of said main gears and said pinions with removable bearings carried thereby to support the main shaft and the drive shaft, each bearing including a removable cover member which is bolted to the gear frame and which may be removed to permit removal of the main and drive shafts and the gears carried thereby.

8. A knuckle press comprising a base, a rigid gear frame mounted on said base and having a central opening with parallel vertical side portions on opposite sides of said opening, a rigid press frame mounted on said gear frame and having a ram mounted for reciprocation therein in a direction which is inclined about 10 to 20 degrees relative to the vertical and toward said gear frame, toggle mechanism carried by said press frame for reciprocating said ram, and means for operating said toggle mechanism including a removable main shaft having a pair of main gears mounted thereon, a removable drive shaft having a pair of pinions mounted thereon for drivingly engaging said main gears, a removable intermediate shaft having a pair of pinions mounted thereon, main shaft bearings mounted on said side portions of said gear frame for supporting the end portions of the main shaft for rotation about a horizontal axis, and a pair of bearing caps detachably and rigidly connected to said side portions to hold the bearings in place, drive shaft bearings mounted on said side portions of said gear frame for supporting the end portions of the drive shaft for rotation about a horizontal axis parallel to said last-named axis, a pair of detachable supporting brackets mounted on said side portions for holding said drive shaft bearings in position, said brackets having openings therein for receiving the end portions of said intermediate shaft, intermediate shaft bearings mounted on said brackets for supporting the end portions of the intermediate shaft and a pair of bearing caps detachably and rigidly connected to said brackets to hold the intermediate shaft bearings in position.

9. A knuckle press as defined in claim 8 wherein means are provided for adjusting the drive shaft bearings from a first position wherein the drive shaft pinions are in driving engagement with the main gears and the drive shaft is parallel to the main shaft to a second position wherein said pinions are out of engagement with the main gears, and means are provided for adjusting the intermediate shaft bearings from a first position wherein the intermediate shaft pinions are in driving engagement with the main gears and the intermediate shaft is parallel to the main shaft to a second position wherein the intermediate shaft pinions are out of engagement with the main gears.

10. A knuckle press as defined in claim 9 wherein the adjusting means comprises an eccentric supporting the shaft bearing and mounted for turning movement between said first and second positions, and releasable means are provided for locking the eccentric in the first or second position.

11. A high-speed double-stroke toggle press having a capacity of several hundred tons and comprising a rigid gear frame, a rigid press frame mounted on said gear frame and having a pair of vertically elongated parallel uprights, a crown at the upper end thereof, and a bed at the lower end thereof, said crown and said bed extending between the uprights in a direction perpendicular to the uprights, a rigid vertically elongated hollow metal slide mounted between said uprights for reciprocation in a direction parallel to said uprights, which is inclined about 10 to 20 degrees relative to the vertical and toward said gear frame, said slide extending between the uprights and having guide means slidably engageable with guide means on said uprights, said slide having a length greater than twice its depth and greater than its width, toggle mechanism telescoped within said slide for reciprocating said slide comprising an upper horizontal knuckle shaft mounted on said press frame with its axis in a fixed position near the bottom of said crown and near the top of said slide, a central knuckle shaft parallel to said upper shaft, a bottom knuckle shaft mounted on the lower portion of said slide with its axis in a fixed position relative to said slide and parallel to said upper end central shafts, a pair of relatively thick horizontally elongated knuckle members of generally rectangular outline pivotally connected for swinging movement within said slide and engaging said central shaft along the major portion of its length to resist bending of said shaft, the first knuckle member extending between said upper shaft and said central shaft and being pivotally connected to said upper shaft and said central shaft, the second knuckle member extending between said bottom shaft and said central shaft and being pivotally connected to said bottom shaft and said central shaft, and a pair of crank arms connected to said central shaft, and motor-driven means for operating said crank arms including a main shaft mounted on said gear frame parallel to said knuckle shafts and a pair of eccentrics mounted on said main shaft and drivingly connected to said crank arms to reciprocate said central knuckle shaft in a direction substantially perpendicular to the direction of movement of said slide from a position near the line of centers of said upper and bottom knuckle shafts and on one side of said line of centers to a position spaced a substantial distance from said line of centers and on the opposite side of said line of centers.

12. A press as defined in claim 11 wherein means are provided for adjusting the distance between the central axis of said eccentrics and the axis of said central knuckle shaft to adjust the stroke of said slide.

13. A press as defined in claim 12 wherein the means for adjusting said distance comprises an eccentric bearing mounted for turning movement on each connecting arm of the toggle mechanism, said eccentric bearing having cylindrical internal and external surfaces and means for locking the bearing in a plurality of adjusted positions.

14. A high speed knuckle press having a capacity of several hundred tons and comprising a rigid gear frame, a rigid press frame mounted on said gear frame and having a pair of vertically elongated parallel uprights, a crown at the upper end thereof, and a bed at the lower end thereof, said crown and said bed extending between the uprights in a direction perpendicular to the uprights, a rigid vertically elongated hollow metal slide mounted between said uprights for reciprocation in a direction parallel to said uprights, which is inclined about 10 to 20 degrees relative to the vertical and toward said gear frame, said slide extending between the uprights and having guide means slidably engageable with guide means on said uprights, toggle mechanism telescoped within said slide for reciprocating said slide; guide means for adjusting the distance between the slide and the upright at each side of the slide comprising a narrow tapered bar having a flat narrow vertical outer face and a flat narrow inner face, the adjacent upright having a flat vertical surface slidably engaging said outer face of said bar, said slide having a flat face engaging said inner face of said bar to permit vertical adjustment of said bar while maintaining said outer face in a vertical position, and means for locking each said bar in a series of adjusted positions.

15. A high speed knuckle press of welded construction having a capacity of several hundred tons and comprising a base, a rigid gear frame carried by said base, and a rigid press frame carried by said gear frame, said press frame having a pair of vertically elongated parallel uprights, a crown at the upper end thereof and a bed at the lower end thereof, said crown and said bed extending between the uprights in a direction perpendicular to the uprights, a rigid vertically elongated hollow metal slide mounted between said uprights for reciprocation in a direction parallel to said uprights, which is inclined about 10 to 20 degrees relative to the vertical and toward said gear frame, said slide extending between the uprights and having guide means slidably engageable with guide means on said uprights, said slide having a length greater than twice its depth and greater than its horizontal width, toggle mechanism telescoped with said slide for reciprocating said slide, each of said uprights having a rectangular cross section and comprising flat plates joined together near the edges, said slide having a substantially rectangular cross section and comprising flat parallel front and rear plates with openings therein to permit movement of the knuckles of the toggle mechanism, and flat parallel end plates welded to said front and rear plates, inwardly projecting guide means carried by said uprights for engaging the rear of the slide, gibs mounted on the front of said uprights and having guide means for preventing movement of the slide away from said inwardly projecting guide means, and means for holding said press frame together comprising four tie rods extending through the crown, the uprights and the bed, two of said tie rods being located within each of the uprights.

16. A high-speed toggle press having a capacity of several hundred tons and comprising a rigid gear frame, a rigid press frame mounted on said gear frame and having a pair of vertically elongated parallel uprights, a crown at the upper end thereof, and a bed at the lower end thereof, said crown and said bed extending between the uprights in a direction perpendicular to the uprights, a rigid vertically elongated hollow metal slide mounted between said uprights for reciprocation in a direction parallel to said uprights, which is inclined about 10 to 20 degrees relative to the vertical and toward said gear frame, said slide having narrow side portions and extending laterally between the uprights, guide means on said slide slidably engageable with guide means on said uprights, toggle mechanism located between said side portions of said slide for reciprocating said slide, said toggle mechanism comprising an upper horizontal knuckle shaft mounted on said press frame with its axis in a fixed position near the bottom of said crown and near the top of said slide, a central knuckle shaft parallel to said upper shaft, a bottom knuckle shaft mounted on the lower portion of said slide with its axis in a fixed position relative to said slide and parallel to said upper and central shafts, a pair of relatively thick horizontally elongated knuckle members pivotally connected for swinging movement within said slide and engaging said central shaft along the major portion of its length to resist bending of said shaft, the first knuckle member extending between said upper shaft and said central shaft and being pivotally connected to said upper shaft and said central shaft, the second knuckle member extending between said bottom shaft and said central shaft, and motor-driven means for moving said central shaft in a direction substantially perpendicular to the direction of movement of said slide between a position adjacent the line of centers of said upper and bottom knuckle shafts to a position spaced a substantial distance from said line of centers.

References Cited in the file of this patent

UNITED STATES PATENTS

| | | |
|---|---|---|
| 1,954,651 | Sherman | Apr. 10, 1934 |
| 2,054,428 | Klocke | Sept. 15, 1936 |
| 2,142,052 | Harter | Dec. 27, 1938 |
| 2,362,970 | Bolland | Nov. 21, 1944 |
| 2,716,900 | Barkham | Sept. 6, 1955 |
| 2,728,288 | Wissman | Dec. 27, 1955 |
| 2,755,147 | Ernst | July 17, 1956 |
| 2,910,898 | Martindell | Nov. 3, 1959 |
| 3,075,403 | Hepner | Jan. 29, 1963 |

FOREIGN PATENTS

| | | |
|---|---|---|
| 1,054,721 | France | Feb. 12, 1954 |
| 472,860 | Germany | Mar. 6, 1929 |
| 1,020,524 | Germany | Dec. 5, 1957 |